Aug. 4, 1936.  H. J. MURRAY  2,050,016
SELECTIVELY CONTROLLED MULTIPLE CLUTCH MECHANISM
Filed June 24, 1931  2 Sheets-Sheet 1
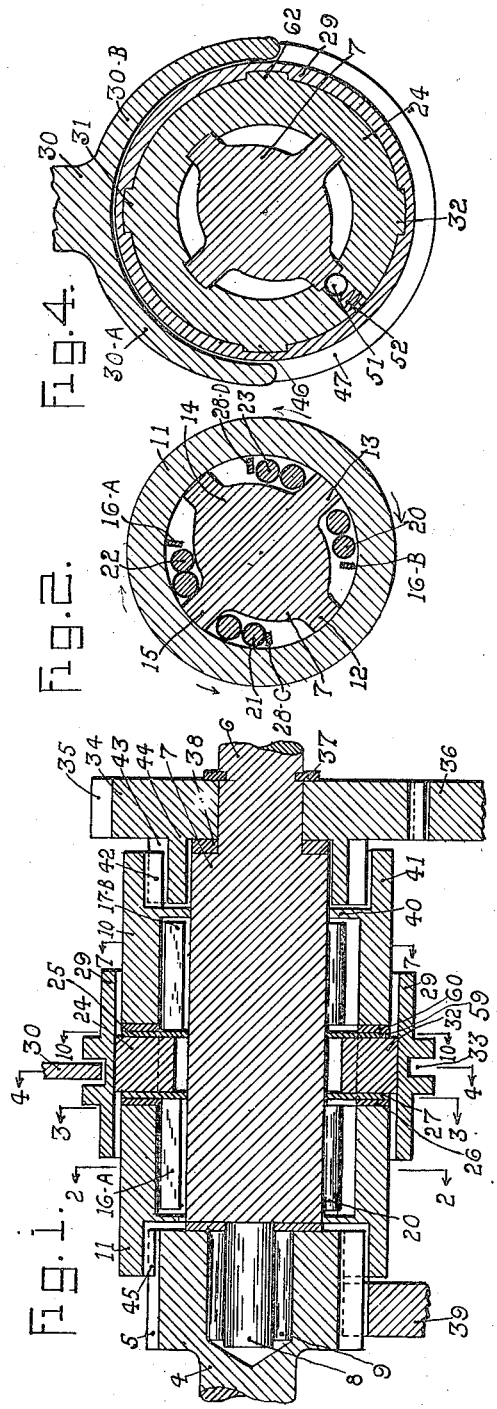
Howard J. Murray.

Aug. 4, 1936.     H. J. MURRAY     2,050,016
SELECTIVELY CONTROLLED MULTIPLE CLUTCH MECHANISM
Filed June 24, 1931     2 Sheets-Sheet 2

Howard J. Murray.
INVENTOR

Patented Aug. 4, 1936

2,050,016

UNITED STATES PATENT OFFICE 2,050,016

SELECTIVELY CONTROLLED MULTIPLE CLUTCH MECHANISM

Howard J. Murray, New York, N. Y.

Application June 24, 1931, Serial No. 546,483

27 Claims. (Cl. 192—48)

My invention relates in general to a simple device for effecting the driving relations of a pair of power transmitting members.

One of the general objects of my invention is to provide means whereby a driving member may be selectively connected to a driven member when the flow of power is in one direction, and also selectively and automatically connected when the flow of power is in the opposite direction.

Another object of my invention is to provide a multiple clutch organization whereby one of the clutches may be selected to automatically act in one direction in accordance with the speed relations of its movable elements and in the opposite direction in accordance with the selectively controlled status of certain other of its movable elements.

Still another object of my invention is to provide means whereby a driving member may be selectively placed in driving relation to a driven member in accordance with the operative status of a manually controlled device.

A further object of my invention is to provide a selective vehicle free wheeling system by means of which the flow of power in one direction will be automatically controlled by the power supply of the vehicle and the flow of power in the opposite direction will be controlled by the manual operation of a selective control device.

An additional object of my invention is to provide means including a plurality of over running clutches whereby one of the clutches may be normally operative while the other of the said clutches is inoperative.

A still additional object of my invention is to provide a double acting clutch mechanism whereby power may be automatically transmitted in a selective manner from a driving element to a driven element, and selectively from a normally driven element to a normally driving element.

The invention also contemplates the co-operative association of a vehicle free-wheeling power transmission mechanism and a lever control mechanism whereby the status of the power transmission will be varied due to the operation of the control mechanism.

In the following description names will be given to parts for convenience of expression, but the names are intended to be as generic in their application to similar parts as the art will permit.

The invention allows numerous physical embodiments and a preferred type is herein illustrated for the purpose of showing an application of the invention, but it is understood that the showings in the drawings are largely diagrammatic merely being sufficient in detail to show applications of the invention.

In the drawings:

Figure 1 is a fragmentary view of part of a power transmission equipped with an embodiment of the inventive features as disclosed in this application.

Figure 2 is a transverse sectional view taken along the line 2—2 of Figure 1.

Figure 3 is a transverse sectional view taken along the line 3—3 of Figure 1.

Figure 4 is a view in sectional elevation taken along the line 4—4 of Figure 1, and shows the details of the control means for releasing one or more of the clutches from an inactive status.

Figure 5 is a side view of one of the control means of Figure 4.

Figure 6 is a plan view of the inner surface of part of a power transmission control means shown in Figure 1.

Figure 7:
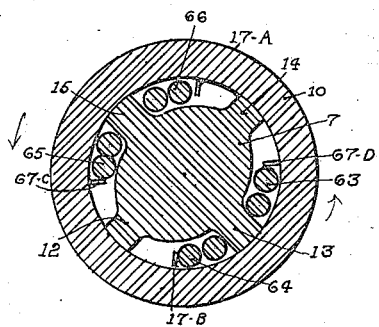
Figure 7 is a transverse sectional view taken along the line 7—7 of Figure 1.

My invention relates to a splineless selective speed power transmission mechanism in which I have brought together in a simple and efficient manner, in combination with a plurality of over-running clutches, a mechanically operated mechanism for quietly effecting desired speed relations between the driving and driven members.

Among the novelties of my invention are, — means for effecting speed relations without shifting or moving gears or jaw teeth; means to improve and simplify the method of connecting the power members of a transmission in driving relation; means to provide free-wheeling; means to provide reverse driving relations; means to provide selected reverse-driving and free-wheeling with a single control means; means to provide selective speed changes, free-wheeling, and reverse-driving with a single control lever.

Referring to the drawings there is shown in Figure 1 a power shaft 4 connected to a source of power supply such as an internal combustion engine as commonly found on automotive vehicles, and a shaft 6 hereinafter designated as the normally driven shaft and connected to drive the wheels of the said vehicle. The shafts 4 and 6 are positioned in axial alignment by means of the bearings 9 suitably positioned in the supporting member 4.

For the purpose of this description the means shown by Figure 1 may be considered as a fragmentary portion of a selective four speed transmission with the parts necessary to effect low and reverse speeds omitted in order to simplify the drawings.

The conventional shift lever has also been omitted as well as the means of connecting the shift rods to same in order to simplify the drawings.

In general it may be assumed that the means shown in Figure 1 are for the purpose of selectively placing the transmission in so-called direct or second speed condition. The gear 39 in mesh with the engine shaft 4, and the gear 36 in mesh with the loosely mounted gear 34 are assumed to be members of a counter shaft cluster.

The normally driven shaft 6 is provided with an enlarged portion 7 preferably ground to suitably support two normally driving members 10 and 11 on the four spokes 12, 13, 14, and 15 as shown by Figure 2. The recesses or depressions between the spokes are ground in a tapering manner to receive two sets of four groups of rollers, such as 20, 21, 22, and 23 to form in effect 4 over-running clutch organizations housed within the outlines of the normal driving member 11, and also four sets of over-running clutch organizations such as 63, 64, 65, and 66 housed within the confines of the normal driving member 10.

The said rollers may be considered as a plurality of sets of clutching elements, which for the purpose of this description may be solid ground various sized cylinders of steel or other suitable material designed to engage the surfaces of the members 6 and 11, and 10 and 6, so that one may be driven from the other according to the speed relations of same. The rollers 21 and 23 may be employed so that the member 11 may selectively drive the power member 6 in a counter clock-wise direction, and the rollers 20 and 22 may be selectively employed so that the member 6 may selectively drive the member 11 in a counter clock-wise direction. In the same manner the rollers 63 and 65 of Figure 7 may be employed so that the member 10 of Figure 1 may selectively drive the power member 6 in a counter clock-wise direction, and the rollers 64 and 66 may be selectively employed so that the member 6 may selectively drive the member 10 in a counter clock-wise direction.

The driving element 11 is provided with jaws 45 formed integral with same designed to be in suitable driving relation with the teeth 5 of the engine shaft 4, and the driving member 10 is provided with jaws 42 designed to be driven from the jaws 43 of the loosely mounted gear 34 due to the constant engagement of the said jaw clutches or teeth 42 and 43. Thus the member 11 will rotate at all times at the speed of the shaft 4, and the member 10 will rotate at all times with the gear 34.

All of the rollers such as 20, 21, 22, and 23 are normally held in the positions shown by Figure 2 by a series of holding or restraining barriers, such as 16—A, 16—B, 28—C and 28—D. A similar set of barriers such as 17—A, 17—B, 67—C, and 67—D, as shown by Figure 7, are housed within the confines of the driving member 10 to hold or retain the rollers 63, 64, 65, and 66.

The barriers such as 28—C and 28—D of Figure 2 are attached to finger like projections 28—A and 28—B of a disc shaped control member 26 as shown by Figure 3. This disc shaped control member is preferably made of steel or other suitable material with its inner surface ground to fit in a rotatable manner on the ground top of the spokes 12, 13, 14, and 15 of Figure 2.

Figure 9:
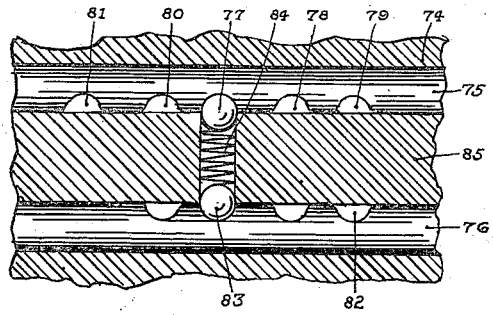
Figure 9 is a sectional view showing the method of interlocking the control rods forming a part of a power transmission and indicates the means for obtaining fixed operating positions for the transmission control mechanism.

This disc is provided with radially extending projections 26—A and 26—B designed to fit into grooved tracks formed by cut-away portions of a splined shiftable member 29 preferably made of steel, and provided with a shift finger slot 33 designed to receive a shift fork 30 preferably made of steel or other suitable material and supported by a shift rod 75 shown in Figure 9. This shift rod is preferably made of hardened steel and ground to fit within a bore within the steel portion 85 forming a portion of the transmission cover.

The said shiftable member 29 is supported by a bearing member 24 having projecting splines such as 31, 32, 46 and 62, and also cut away portions designed to receive the ground ends of the spokes 12, 13, 14, and 15, as clearly indicated by the Figures 3 and 4.

Thus it will be evident that during assembly the said bearing 24 may be moved along the portion 7 of the driven member 6 on the outer portion of the spokes until the retaining ball 51 falls in place due to the pressure of the seating spring 52 of Figure 4. Thus the bearing 24 will be definitely positioned with respect to the driving members 10 and 11 as shown by Figure 1 and will rotate in unison with the driven member 6. As the shift finger 30 with its branch fingers 30—A and 30—B is moved in either direction due to its connection with a conventional shift rod such as 75 of Figure 9, it is evident that the said shiftable member 29 will rotate with the shaft 6.

It is evident therefore that the shiftable member 29 splined to the bearing member 24, and the bearing member 24 splined to the shaft 6 will rotate in unison. As the member 29 is moved to the left by the shift fingers 30—A and 30—B, it may rotate one or both of two disc control members such as 26 and 27, as shown on Figure 1. As the said member 29 is moved to the right, it may rotate one or both of the disc shaped control members 59 and 60 as hereinafter described.

The method of rotating the said members 26, 27, 59 and 60 may be more clearly seen by reference to the plan view in elevation as shown by Figure 6. This plan view shows the left hand half of the inner periphery of the slidable member 29. Thus the plan view of Figure 6 shows only a portion of the inner plan of the member 29. The remaining portion of this inner surface of slidable member 29 may be seen by reference to Figure 8. Figure 6 indicates the necessary grooves for the rocking or actuation of disc control members 26 and 27. The grooves for operating the disc members 59 and 60 are oppositely disposed to the grooves shown by Figure 6 and are similar except relatively reversed as may be seen by reference to Figure 8.

Now the shift rod 75 of Figure 9 to which the shift fork 30 is operatively connected is assumed to be in neutral position so as to definitely position the shift fork 30 in the normal inoperative position shown in Figure 1. If it is desired to connect the power members 4 and 6 in a direct drive relation for what is commonly known in the art as high speed the shift rod 75 of Figure 9 will be manually or otherwise actuated so as to move the shift finger 30 to the left and thereby the slidable control element connected therewith also to the left.

The fingers 27—A, 27—B, 26—A, and 26—B of the disc elements 26 and 27 are in position in the control tracks as shown by the dotted line 48 of Figure 6. This is the position the control fingers will assume when the transmission is in neutral. When the shift finger 30 is in neutral position as shown by Figure 1, then the control finger 27—A of control disc 27 is in the position shown by the dotted line 48, and control finger 26—B of disc element 26 is also in the plane of the dotted line 48. The dotted lines 48, 49 and 50 may be more clearly defined for future reference as the relative planes of fingers 27—A and 26—B when successively in neutral position, free-wheeling position and reverse drive position. Thus, if the spline member 29 is moved to the left by the shift fork 30, the control fingers 27—A and 26—B will be relatively moved to the plane 50 of Figure 6. Actually of course the slidable member 29 moves, and the control fingers are stationary.

The track 53 is straight to this plane 50 and thus the finger 27—A will not be affected in its stationary position by the movement of the slidable member 29, and hence the disc 27 will not be rotated or the barriers 16—A and 16—B will not be moved relative to the clutch rollers such as 20 and 22 of Figure 2. In this event these clutch rollers will not be affected by the relative speeds of the power members 4 and 6, because they are prevented from becoming active by the barriers 16—A and 16—B.

It should be noted that normally all the barriers such as 16—A, 16—B, 28—C and 28—D are in the positions shown in Figure 2, and thus it is obvious that all of the rollers such as 20, 21, 22, and 23 are inactive and are prevented from becoming active as long as the slidable member 29 is held in neutral position by the shift fork 30.

As the slidable element 29 is moved to the left the control finger 26—B of Figure 6 will meet the inclined portion 55 of the track 56 shown on the lower half of the plan view of Figure 6 so as to translate the axial movement of the slidable element into a counter clockwise rotary motion of the disc control member 26 and thus move the barriers 28—C and 28—D of Figure 2 in a counter clock-wise direction away from the clutch rollers 21 and 23 and thus place the same in a condition to be moved into clutching relation due to the relative motion of the power members 4 and 6.

Now let it be assumed that the power member 4 is rotating at a faster rate of speed than the power member 6. In this event the rollers 21 and 23 will be moved to connect the said members whereby the power member 6 will be driven from the power member 4 at the same speed and thus the transmission mechanism will be in a direct or high speed drive condition.

It should be understood that the normal driving power member, such as 4, is conventionally connected to the internal combustion engine placed on the vehicle on which the transmission is installed (not shown). It should be further understood that this connection of the power member 4 to the said engine may be broken by the conventional foot clutch as desired by the operator. In other words, the clutch may be manually operated as desired by the operator of the vehicle to disconnect the power member 4 from the said engine in the conventional manner.

If the car is under motion and the power member 6 rotating faster than the member 4 a free-wheeling condition will exist because the barriers such as 16—A and 16—B will prevent the clutch rollers 20 and 22 from becoming active.

If the said conventional foot clutch is (in) and the engine is accelerated, the member 4 will be increased in its rate of rotation so as to exceed the rate of rotation of the member 6 and thus the member 6 will be driven from the member 4 by the clutch rollers 21 and 23 as hereinbefore described.

Thus I provide a combined free-wheeling and speed changing combination by means of which the power members 4 and 6 may be selectively connected and thereafter automatically connected and disconnected as a function of the speed relations of the same.

Now it may be desired to place the transmission mechanism in a condition to drive the engine from the rear axle and thereby to secure the benefit of the engine compression to aid in reducing the momentum of the car and thus reduce the wear on the brakes. In many driving conditions it is considered by many drivers that the vehicle is under better control when the engine is connected to the rear axle. In any event I provide means whereby a reverse drive condition may be selectively effected by the simple act of manually or otherwise releasing the roller barriers such as 16—A and 16—B of Figure 2.

It will be noted that the slidable element 29 is provided with track portion 57 (see Figure 6) and that this track portion is designed to receive the control fingers beyond the normal high or direct speed position. If the slidable member 29 is moved to a new position beyond this point, the continued axial movement of the member 29 to the left will be translated into a relatively clock-wise rotation of the control disc member 27 so as to move the barriers 16—A and 16—B in a clock-wise direction away from the rollers 20 and 22.

It should now be evident that the power member 6 due to its faster rate of motion during the reverse drive intervals will actuate the clutch rollers 20 and 22 in a manner known and accepted in the art to thereby drive the power member 4 and thus connect the vehicle rear axle to the internal combustion engine.

The shift finger 30 is attached to the shift rod 75, and therefore moves integral with the same in its reciprocating motion. The rod therefore is moved to the left to the point where the ball 77 falls into the positioning notch 78. This movement releases the barriers 28—C and 28—D so that the clutch rollers 21 and 23 are placed in an operating relation and the barriers 16—A and 16—B are not moved. Thus the notch 78 may be designated as the direct-drive freewheeling notch. As the shift rod 75 is moved still further to the left to release the barriers 16—A and 16—B, the ball will be forced out of the notch 78 and into the notch 79. Thus the notch 79 may be designated as the direct-drive reverse-drive notch. In the same manner when the shift rod 75 is moved to the right from the position shown in Figure 9, the ball 77 will be forced out of the neutral notch and into the notch 80. During this movement the barriers 67—C and 67—D will be moved counter clockwise to release the clutch rollers 65 and 63 as hereinbefore stated. Thus the notch 80 may be designated as second-speed free-wheeling notch. As the shift rod is moved still further to the right the ball 77 will be forced out of the notch 80 and into the notch 81. This will release the barriers 17—A and 17—B of Figure 7 and thus the notch 81 may be designated as second-speed reverse-drive notch.

Thus with a sequential movement of a single shift finger such as the member 30 I am able to selectively connect the driving and driven power members such as 4 and 6, first in a direct drive relation and also in a free-wheeling relation. In addition I am able to use the same control lever in a continued movement to connect the driving and driven power members such as 4 and 6 first in a direct drive relation and also in a reverse drive relation. Still further I am able to use the same lever in a reverse movement to selectively place the power members in a plurality of speed relations as hereinafter described.

If it is desired to return the transmission to a free-wheeling status at direct drive relations, the shift finger is moved to the right as the slidable member 29 is moved to the right. In this event the control member 27 will now be rotated counter clock-wise due to the action of the track portion, and thus the disc control member 27 and consequently the barriers 16—A and 16—B will be moved counter clockwise so as to again prevent the clutch rollers 20 and 22 from connecting the members 4 and 6 in a driving relation. Thus the transmission will again be returned to a free-wheeling condition. It should be noted in passing that the slidable control member 29 may be thus moved into the said free-wheeling position without operating the conventional foot clutch (not shown), or even decreasing the speed of the engine. If the member 4 is driving the member 6 at the instant of the shifting of the slidable member 29, the barriers such as 16—A and 16—B may be moved into the retarding position without any appreciable effort. This should be evident as the clutch rollers are not in a clutching position under these conditions.

If the slidable member 29 is now returned to the neutral position as shown in Figure 1, the control finger 27—A will not be affected by the relative movement of the track portions 48 and 50. The control finger 26—B will however be rotated clock-wise due to the effect of the track portion 55 to thus rotate the control disc 26 clock-wise and thereby move the barriers 28—C and 28—D back to the original position, thus to render the clutch rollers 21 and 23 inoperative. This operation should be accomplished with a decrease of fuel supply to the engine so that little or no retardation will be offered by the clutch rollers 21 and 23 when pushed back by the barriers to an inoperative position. Thus at neutral position both the power members such as 4 and 6 will be in a disconnected status during relative movement in either direction and the transmission is therefore in a neutral condition, and no power can be transmitted from the engine to the rear axle, or from the rear axle to the engine.

It should be evident to those skilled in the art that the track portions of Figure 6 could be modified to effect several combinations of free-wheeling and reverse-drive conditions without departing from the spirit of the invention.

A loosely mounted gear such as 34 is suitably positioned on the shaft 6 by the snap ring 37 so as to loosely rotate on the said shaft and to normally be driven from the counter shaft gear 36 forming a portion of a gear cluster including the constant mesh gear 39 meshing with the engine gear 5.

The loosely mounted gear 34 may be designated for the purpose of this description as the second speed gear of the transmission mechanism and may be made of steel or other suitable material.

Figure 8:
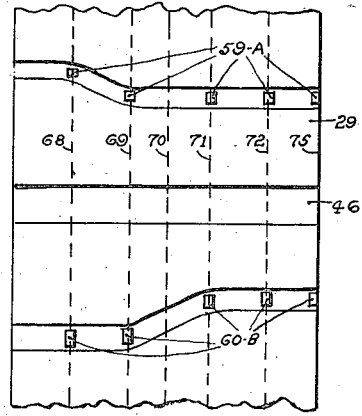
Figure 8 is a plan view of part of a power transmission control means and shows the opposite side as distinguished from that shown in Figure 6.
Figure 10:
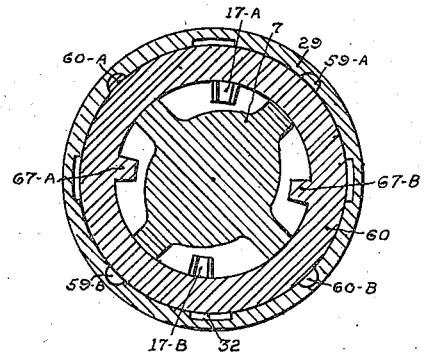
Figure 10 is a transverse sectional view taken along the line 10—10 of Figure 1.

Now if the slidable member 29 is moved from its neutral position, as shown in Figure 1, then the tracks as shown by Figure 8 oppositely disposed on slidable element 29 and relatively reversed to those shown by Figure 6 will cause the control finger 60—B of control disc 60 of Figure 10 to be moved counter clock-wise. In this event the clutch barriers such as 67—C and 67—D of Figure 7 will be rotated counter clock-wise to connect the power members 10 and 6 in driving relation in the same manner as the movement of the barriers 28—C and 28—D of Figure 2 permitting the power members 11 and 6 to be placed in a driving relation.

This operation will cause the engine to be connected to the rear axle by means of gear 5, gear 39, the counter shaft (not shown), gear 36, gear 34, power member 10, rollers 63 and 65 of Figure 7, and driven power shaft 6. Thus I am able to selectively place the transmission mechanism in a plurality of speed relations by the simple movement of relatively light and small portions, such as the slidable member, 29, disc members 26 and 60, and the barriers 28—C, 28—D, 67—C and 67—D. This selective connection may be made without noise or clash as no jaws or gears are moved into driving relation. In addition, the change of speed relation may be made without operating the conventional foot clutch (not shown). If no further action is taken by the operator of the vehicle upon which the transmission is installed, a condition will thus be obtained for either of the direct or second speed relations so as to obtain a free-wheeling operation when the power member 6 is driven by the said vehicle, and thus in this particular operation no power will be transmitted from the power member 6 to the power member 4.

A continued movement of the slidable member 29 to the right will cause the track portions of Figure 8 to relatively move to the right so as to bring the control fingers 59—A and 60—B to the position shown by the dotted line 68, and thus the control finger 59—A will be moved so as to rotate the control disc 59 in a clock-wise motion and thereby move the barriers 17—A and 17—B away from the rollers 64 and 66 of Figure 7 and thus a reverse-drive at second speed conditions will be effected when the car drives the power member 6 of Figure 1. The parallel dotted lines 48, 49, and 50 of Figure 6 are included to indicate the various relative operating positions of the projecting fingers 26—B and 27—A as a result of the selective axial movement of the shiftable control member 29. The parallel dotted lines 69, 70, 71, and 72 of Figure 8 are included in the drawings to indicate the relative slot positions of the extending disc fingers 59—A and 60—B as a result of the selective axial movement of the slidable member 29. The line 75 indicates the right end of the slidable member 29 as shown on Figure 8.

It is obvious that a more or less conventional interlock may be employed with slight modifications to insure the holding of the slidable member 29 in the said neutral, forward driving, free-wheeling, and reverse-drive conditions as it is moved to certain positions to effect such conditions.

One of these possible interlock modifications is shown by the means indicated by Figure 9. In this combination the rod 76 is assumed for the purpose of this description to be the low and reverse speed shift rod, and 75 the high and second speed shift rod employed to move the shift fingers 30—A and 30—B of Figure 4 in either direction as hereinbefore explained. The portion 85 is assumed to be a portion of the transmission cover and is formed with borings to receive the shift rods 75 and 76 to slide therein. The shift rods 75 and 76 are controlled in their relative movements by an interlocking means including the spring 84 and the balls 77 and 83. The total thickness of the spring when compressed and the balls 77 and 83 is greater than the distance between the rods 75 and 76. Thus it is evident that the two rods cannot be moved relative to the said two balls at the same time. With this interlocking arrangement it is obvious that the slidable member 29 will be held in definite operating positions, and thus the control fingers of the control discs 26, 27, 59, and 60 will be held in a definite operating position due to their engagement with the cut-away track portions of member 29. In this event all of the barriers such as 28—C, 28—D, 16—A, 16—B, 67—C, 67—D, 17—A and 17—B will also be held in fixed operating positions. It should be noted in passing that I have provided a selective speed changing mechanism which can be operated to effect a plurality of operating relations between the movable members included in the combination and without any restraining springs other than the interlock spring 84 shown on Figure 9.

While I have shown the invention in connection with the high and second speed portions of a multi-speed transmission, it is obvious that the invention may be applied to all the speeds. For example, the means shown in Figure 1 may also be applied to low and reverse speed without departing from the spirit of the invention.

It should be obvious that a vehicle equipped with such a device could be controlled by an operator from a single lever so as to employ free-wheeling or reverse power drive at the option of the said operator. The same lever may also be used to effect selective speed changes without meshing gears or jaw clutches. It is within the scope of the present disclosure to apply the means as described to any form of power transmission wherein selective speeds are required in connection with coasting and reverse drive.

It should be noted in passing that it will be possible to leave the car in high or second speed on a grade with the slidable member at maximum displacement in either direction.

While I have shown and have pointed out certain novel features of my invention, it should be obvious to those skilled in the art that various omissions and substitutions in the form and details of the device as illustrated may be employed by those skilled in the art without departing from the spirit of my invention.

For example, the clutch rollers 22 and 23 of Fig. 2 and the rollers 65 and 63 of Fig. 7 may be omitted entirely and a selective speed free-wheeling transmission will be provided.

Having thus described my invention, I claim:

1. In a device of the class described, a driving shaft and a driven shaft each associated with a plurality of clutching surfaces, a plurality of sets of roller clutching means for selectively connecting the driven shaft by means of certain of the surfaces to the driving shaft in a plurality of speed relations as the speed of the driving shaft tends to exceed that of the driven shaft, for automatically disconnecting the said shafts when the speed of the normally driven shaft tends to exceed that of the normally driving shaft, and for selectively placing the shafts in a bidirectional driving relation without regard to the relative speeds of the said shafts, a plurality of roller restraining barriers operatively associated in groups for selectively controlling the connecting operation of the said roller clutching means, means constituting disc shaped members, a common actuating means provided with guides on its inner periphery including cammed surfaces for selectively controlling the movement of the said barriers, and a single selector for actuating the said common actuating means, said disc shaped members rocked about said common axis singly and in groups as a function of the axial movement of the cammed surfaces of the said common actuating means.

2. In a power transmission including a plurality of driving members each formed with a single cylindrical clutching surface and a driven member formed with curved clutching surfaces, a shiftable member and a plurality of clutch roller means, rocking members mounted for rotary movement about a common axis and designed to be selectively actuated singly and in groups by the movement of the said shiftable member, a plurality of clutch roller control portions attached in groups to the said rocking members whereby movement of the shiftable member from a neutral position in one direction will permit certain of the said clutch roller means to establish a direct forward-drive free-wheeling status in the said transmission, a continued movement of the said shiftable member establishing a bidirection direct drive status, an opposite movement, a neutral driving status, a still additional movement in the same opposite direction an intermediate free-wheeling status, and a still further additional opposite movement an intermediate bidirectional status in the said transmission, said shiftable member encircling the said rocking members, and means for moving the shiftable member.

3. In a combined selective speed-changing, free-wheeling, and bidirectional power transmission mechanism, a manually actuated control means movable axially in both directions and equipped with a plurality of guides in its inner periphery, a plurality of control discs each equipped with control fingers designed to move in the said guides thereby to rotate certain of the said discs as the said control means is moved, a plurality of clutch rollers, a plurality of clutch roller barriers attached to the said discs to selectively release said rollers from an inoperative status as the said control discs are selectively rotated, a normally driven member and a plurality or normally driving members designed to selectively drive one from the other according to the selective releasing action of the said barriers, and interlocking means for positioning the said manually actuated control means in a fixed operating position.

4. In a selective forward drive, free-wheeling, and bidirectional power drive mechanism, a plurality of axially fixed power members designed to transmit power from one to the other when selectively connected to each other by a plurality of groups of clutch rollers, means constituting the said groups of clutch rollers, a plurality of rocking members fixed against axial movement and each provided with a group of fingers designed to selectively permit certain of the said clutch roller groups to selectively connect the said power members, an axially shiftable control member provided with a guide with a cammed surface for each of the rocking members, said guides on the inner periphery of the said control member and operatively connected to the said rocking members thereby to selectively rock the same singly and in groups, said shiftable member encircling the said rocking members and provided with guides for receiving portions of the said rocking members, and a manually actuated means for selectively moving the said control member.

5. In a power transmission including a plurality of driving members each provided with a clutching surface and a driven member provided with a plurality of clutching surfaces, a plurality of groups of clutch rollers fixed against axial movement and mounted for rotation between the said surfaces, an axially shiftable control member supported by one of the members and encircling both of the said surfaces, a singe manually controlled element for selectively moving the said shiftable member, and a plurality of rockable axially fixed clutch control members co-operatively associated with the said shiftable member, said control members each provided with a group of barrier fingers co-operatively associated with a given group of clutch rollers whereby the said shiftable member will cause certain of the said groups of fingers to be moved clock-wise and certain other of the said groups of fingers to be moved counter-clock-wise in a selective manner to selectively control the driving action of the said power members, and interlocking means for operatively holding the said shiftable member at any one of a plurality of positions along its shiftable path.

6. In a device of the class described including driving and driven elements, a single manually operated selector element, an axially shiftable element mounted for rotation about a given axis, said shiftable element operatively connected to the said selector element to be shifted thereby in either direction along the said axis, a plurality of rocking members symmetrically positioned about the said axis and provided with radially extending fingers fitting into cut-away portions of the said shiftable element whereby the said rocking members will be selectively rocked by a shiftable movement so as to selectively rock singly and in groups, a plurality of groups of barrier fingers attached to the said rocking members, a plurality of clutch elements constituting clutch rollers positioned in groups between the said driving and driven elements and normally held in an unclutching position by the said groups of barrier fingers, certain of said barrier fingers positioned on one side of certain groups of the said clutch rollers and certain other of the said barrier fingers positioned on a relatively opposite side of certain other groups of the said clutch rollers, and interlocking means for holding the said shiftable element in a plurality of axial positions.

7. In a multi-speed power transmission mechanism, the combination of a common manually controlled speed selector, a shiftable member operatively associated with the said selector so as to be moved in two directions in steps from a neutral position and to the said neutral position from a plurality of displacements, a plurality of clutch rollers, a plurality of controlling members mounted about a common axis constituting a first rocking member, a second named rocking member, a third named rocking member, and a fourth named rocking member, a plurality of barrier fingers connected to the said rocking members and positioned adjacent the said clutch rollers and constituting a first named group of fingers connected to the first named rocking member, a second group of fingers connected to the second named rocking member, a third group of fingers connected to the third named rocking member, and a fourth group of fingers connected to the fourth rocking member, a normally driven member provided with a plurality of developed clutching surfaces, a plurality of normally driving members each provided with a clutching surface whereby groups of the said clutch rollers may be placed between certain of the said driving and driven surfaces so as to be normally held in an unclutching status when released, and means for mounting the said shiftable member against relative rotation on the said driven member.

8. In a device of the class described, the combination of a plurality of driving elements each provided with a cylindrical clutching surface, a driven element provided with a plurality of clutching surfaces, said elements mounted for rotation about a common axis, a plurality of clutch rollers arranged for selectively placing the said elements in a plurality of free-wheeling and bidirectional speed driving relations when certain of the said clutch rollers are released from a restrained position, a plurality of control means designed to selectively cause the said roller release thereby permitting certain of the said elements to move the said selected rollers into an operative position as the other rollers are restrained to remain inoperative, said restraining means including a plurality of restraining fingers connected in groups to a plurality of rockable members forming part of the said control means, a slidable member including a plurality of cammed guides axially disposed about the inner periphery of same for selectively actuating the said rockable members, and interlocking means for positioning the said slidable member in a locked position.

9. In a power transmission mechanism, a plurality of driving elements each provided with a clutching surface, a normally driven element provided with a plurality of clutching surfaces, said elements mounted for rotation about a common axis, a plurality of separately positioned sets of normally restrained clutch rollers arranged to selectively connect the said elements in a plurality of speed driving relations when selectively unrestrained and the selected driving element tends to rotate faster than the said driven element to automatically disconnect the said elements when the normally driven element tends to rotate at a faster rate than the selected driving element, and to connect the said elements in a bidirectional driving relation without regard to the relative speed of the selected elements, a plurality of clutch roller restraining barriers formed for normally causing the said restraint of the said clutch rollers, a plurality of disc shaped members mounted about a common axis of rotation for selectively positioning and actuating groups of the said barriers, and manually actuated means formed with a plurality of guides with camming portions for selectively actuating the said disc shaped members singly and in groups according to the direction and extent of its axial movement.

10. In a device of the class described, a driving means including a plurality of speed change elements each provided with a clutching surface, a driven member provided with a plurality of clutching surfaces, a plurality of separate groups of normally restrained clutch roller means for selectively connecting when unrestrained the driving means to the driven member in a plurality of speed driving relations when the said driving elements are rotated faster than the said driven member, said clutch roller means arranged to be automatically disconnected as a function of the speed relations of the said driving elements and the said driven member, a plurality of separate groups of selectively actuated barriers for selectively permitting certain of the said groups of the said clutch roller means to become selectively operated thereby to selectively connect the said driving elements to the said driven member to affect the said speed relations, and means including a disc shaped rockable member for each set of clutch-rollers and mounted on the driven member between the sets of rollers, said discs constituting selectively actuated control portions arranged for selectively actuating certain of the said barriers while rotating.

11. In a combined free-wheeling and bi-directional drive transmission mechanism, including driving members each formed with a clutching surface and a driven member provided with a plurality of clutching surfaces, a plurality of groups of clutch roller means arranged for selectively causing certain of the said clutching surfaces to assume the same speed as a result of relative movement of the said surfaces so as to selectively establish a plurality of bi-directional drive speed relations, to selectively connect certain of the said members when the speed of the selected driving member exceeds that of the driven member, and to automatically disconnect the said members when the speed of the driven member exceeds that of the selected driving member, and a plurality of remotely controlled selectively actuated groups of restraining clutch roller barriers formed for selectively permitting the operation of the clutch rollers for establishing the said speed relations, and a common axially movable control element encircling the said barriers and formed with a cammed guide for each barrier for selectively actuating the said groups of barriers as the other control element is moved axially, and a single selector for actuating the said common control element.

12. In a device of the class described including a plurality of power members each formed with a cylindrical clutching surface and a power member formed with a plurality of curved clutching surfaces, the combination of two sets of two groups each of clutch roller elements associated with a cylindrical surface and certain of said curved surfaces and mounted for rotary motion about a common axis with the said power members, each group set of clutch rollers designed to separately place the said power members in a different speed driving relation, one of the said groups of clutch rollers formed to be operative when released from a restrained position by the selective movement of a group of roller barrier elements as the other said clutch roller group for a given speed relation is rendered inoperative due to the selected holding tendency of a second group of selectively actuated roller barriers, means constituting the said barriers, said barriers arranged when selectively operated to release the said second group of clutch rollers from an inoperative position thereby to place both sets of groups of clutch rollers for a given speed in operative condition at the same time to permit bi-directional drive for the given speed, control means including radially extending fingers carried by one of the said power members to rotate therewith in a rockable manner and constituting the said selective barrier moving means, and common manually controlled means provided with a plurality of cammed guides for selectively actuating the said barrier moving means singly and in groups thereby to selectively remove the said barrier restraint from the rollers associated with a selected pair of power members whereby one or both groups of rollers may sequentially become operative due to the relative movement of the said power members.

13. In a multi-speed transmission mechanism, a plurality of driving and driven power members each formed with one or more clutching surfaces, a plurality of sets of clutch rollers mounted on the driven member, a plurality of sets of clutch roller control barriers positioned in operative relation to the said clutch rollers to rock same in groups and mounted on said driven member, a plurality of rockable members formed to support and move the said barriers singly and in groups, an axially shiftable common control member mounted on the driven member and designed to selectively actuate the said rockable members when moved axially, a single selector element adapted for actuating the said axially shiftable control member, means for operatively positioning the above named whereby the said selector may be operated to cause the said shiftable member, said rocking members, said barriers, and said rollers to place the said transmission in desired sequence in a forward direct drive and free-wheeling bi-directional status, a direct drive bi-directional status, a second speed free-wheeling status, a second speed bi-directional status and a neutral status.

14. In a multi-speed power transmission including a plurality of driving members each provided with an element of a clutch and a driven member provided with a plurality of clutch elements, two sets of two groups each of clutch rollers positioned between each clutch element of a driving member and a plurality of clutch elements of the driven member, a restraining barrier positioned adjacent to each of the said roller sets, said barriers mounted for movement about a common axis, rockable control means connected to sets of the said barriers whereby certain of the said barriers will be moved away from certain of the said roller sets, said rockable control means adapted to selectively move certain other of the said barriers to release certain other sets of clutch rollers whereby another selected driving member will be automatically connected to the driven member when it tends to rotate faster or slower than the driven member so as to effect a bi-directional drive, and means for selectively affecting the action of the said control means whereby any of the said driving members may be connected to the said driven member by the proper actuation of the said rockable control means, said barriers and said rollers.

15. In a device of the character described, the combination with driving and driven members, said driven member having oppositely disposed cammed surfaces, gripping members in the form of rollers co-operating therewith to act as unidirectional clutches, means in the path of the rollers to prevent the operation thereof, and axially shiftable means encircling the roller preventing means and provided with axially extending cammed guides symmetrically positioned about a common axis for collective axial movement for selectively releasing the said rollers in groups at one axial position and in groups of groups at a second axial position in two directions relative to a neutral position for connecting the driving and driven members in unidirectional and bidirectional drive relations.

16. A clutch device for coupling either of a pair of driving members with a driven member, said driven member having oppositely disposed cammed surfaces, rollers co-operating therewith comprising four unidirectional clutch organizations, barrier means for rendering the clutches inoperative, and a shiftable element formed with axially extending cammed guides axially disposed about a common axis for selectively releasing the said barriers and thereby the said clutches for connecting the said driven member with either of the said driving members in unidirectonal and bidirectional drive relations.

17. A device for connecting driving members and a driven member, comprising two oppositely disposed restrained clutches associated with each of the said driving members, and means encircling the clutch restraining means and provided with longitudinally extending cammed guides symmetrically positioned about a common axis for collective axial movement for selectively removing said restraint thereby to permit a selected driving member to actuate the released clutches to effect a desired drive relation with the driven member.

18. In a device of the class described, the combination with driving and driven members, said driven member having oppositely disposed cammed surfaces, rollers co-operating therewith to act as unidirectional clutches, means in the path of the rollers to normally prevent the clutching action thereof, and means encircling the roller preventing means and provided with transverse cammed guides for separately operating the said preventing means, said cammed guides symmetrically positioned about a common axis for collective axial movement for selectively releasing the said rollers for connecting the said members in a plurality of drive relations, each drive relation effected by a different axial movement of the said guides.

19. A clutch device for coupling either of a pair of driving members with a driven member, comprising four sets of unidirectional clutches, means for rendering the clutches normally inoperative, and a movable element encircling the means for rendering the clutches inoperative and provided with longitudinally extending guides positioned about a common axis for collective axial movement for selectively releasing the said clutches to permit the said members to move same for connecting the driven member with either of the driving members in unidirectional and bidirectional drive relation according to the direction and extent of movement of the said movable element.

20. In a device of the class described, the combination of a driving member and a driven member, a plurality of clutching means for placing the said members in a plurality of driving and inoperative relations when the said driving member is moving at a faster rate than the said driven member, a plurality of clutch controlling barriers designed to be selectively actuated thereby to control the action of the said clutch means and thereby to selectively and positively place the said members in the said driving and inoperative relations, said driving and driven members designed to be automatically disconnected from a driving relation when the normally driven member is rotating at a greater speed than the said normally driving member, and manually actuated control means for selectively operating the said clutch controlling barriers.

21. In a power transmission including a pair of power members, a shiftable control member and a plurality of clutch means, a plurality of control members designed to be selectively actuated by the movement of the said shiftable member, a plurality of clutch control portions attached to the said control members and positioned relative to the said clutch means to permit same to move from an inoperative position whereby an initial movement of the shiftable member in a first direction will cause certain of the said clutch means to establish a direct-drive free-wheeling power transmission, a continued movement in the first direction will cause the said clutch means to establish a direct-drive bidirectional transmission, an initial movement of the said shiftable member in a second direction will cause certain of the said clutch means to establish an intermediate free-wheeling power transmission, a continued movement in the said second direction will cause the said clutch means to establish an intermediate bidirectional transmission, and manually actuated means for moving the said shiftable member in the said directions.

22. In a transmission mechanism, a control means movable axially and formed with tracks on its inner periphery, a plurality of control members each equipped with sets of control fingers designed to be received by the said tracks thereby to selectively move the said control members as the said axially movable member is moved, a plurality of clutch retaining fingers connected to the said control members, a plurality of clutch rollers associated with the said clutch retaining fingers and designed to be selectively released by the said fingers so as to be moved into a clutching position, a driving member and a driven member designed to be driven or to drive one from the other in a plurality of speed relations according to the clutching action of the said rollers as a result of the said clutch movement, and means for positioning the said manually actuated control means in a desired operating position.

23. In a combined free-wheeling and bi-directional connection drive transmission mechanism including a plurality of axially fixed driving members and a single axially fixed driven member, a plurality of axially fixed groups of clutch roller means for selectively causing the said driving and driven members to assume the said speed driving relations when relatively moved by the said members, axially fixed permitting means for selectively permitting the said members to move the said rollers, axially movable means for actuating the axially fixed permitting means, and a single selector for selectively operating in two directions the axially movable means.

24. A clutch device for connecting driving members and a driven member, comprising restrained bidirectional clutches arranged to be selectively released, and shiftable means for controlling the clutch restraining means to selectively effect a plurality of unidirectional and bidirectional drive relations between the driving members and the driven member.

25. A clutch device for coupling either of a pair of driving members with a driven member, comprising two selectively controlled bidirectional clutch organizations, means for rendering the clutches inoperative, and a shiftable element for selectively releasing the said clutches for connecting the said driven member with either of the said driving members in unidirectional and bidirectional drive relations.

26. A clutch device for connecting driving members and a driven member, comprising separately restrained bidirectional clutches, and control means for releasing the said clutches whereby a selected driving member will move the released clutch means to connect the said driving member to the driven member in unidirectional and bidirectional drive relations.

27. A clutch device for coupling either of a pair of driving members with a driven member, comprising two sets of cooperatively associated bidirectional clutches, means for rendering the clutches normally inoperative, and a movable element for selectively releasing the said clutches to permit the said members to move same for connecting the driven member with either of the driving members in unidirectional and bidirectional drive relations.

HOWARD J. MURRAY.